Oct. 20, 1942.                G. MOORE                    2,299,246
                        WATER SOFTENING SYSTEM
                        Filed Aug. 2, 1938          4 Sheets-Sheet 1
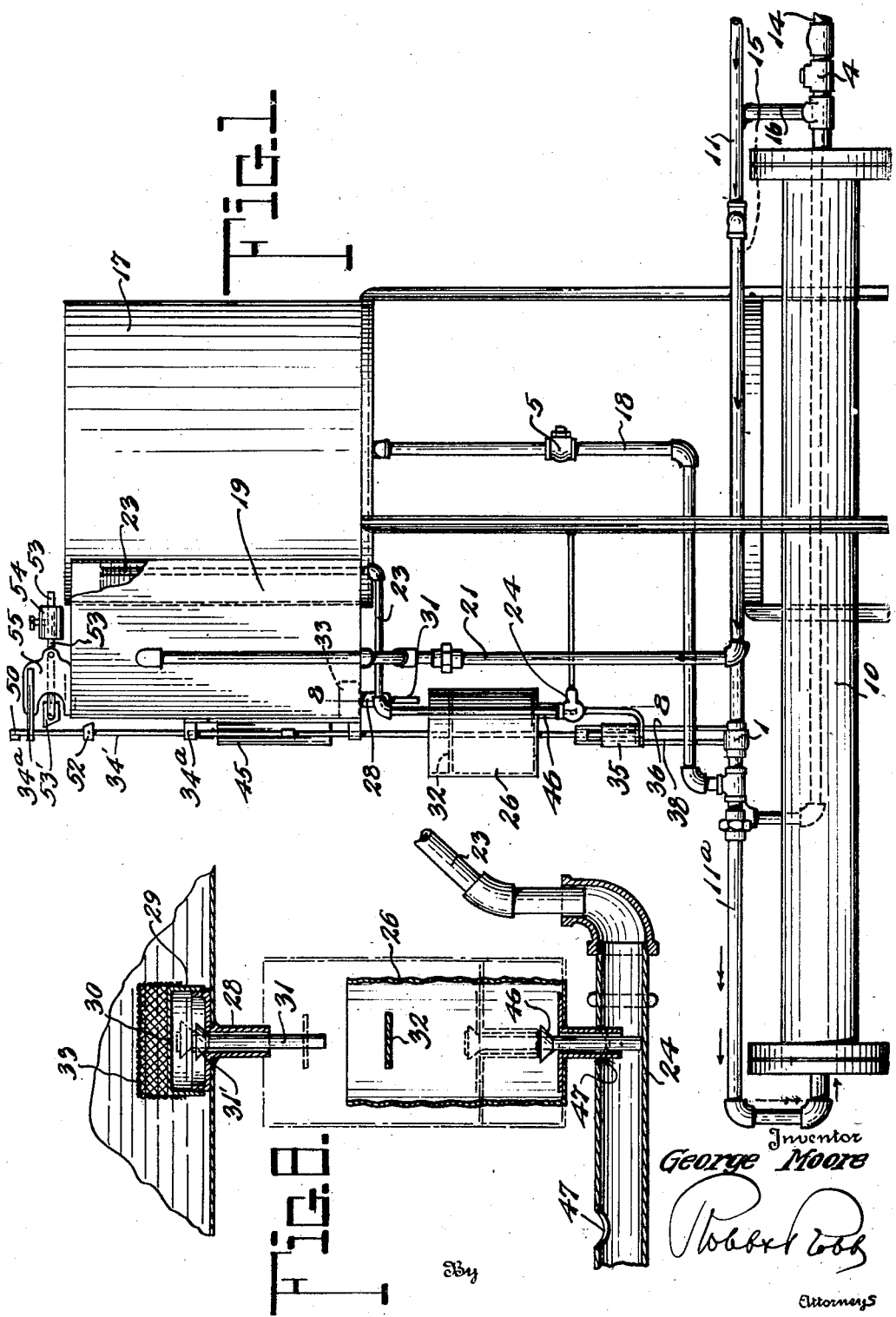

Oct. 20, 1942.  G. MOORE  2,299,246
WATER SOFTENING SYSTEM
Filed Aug. 2, 1938  4 Sheets-Sheet 2
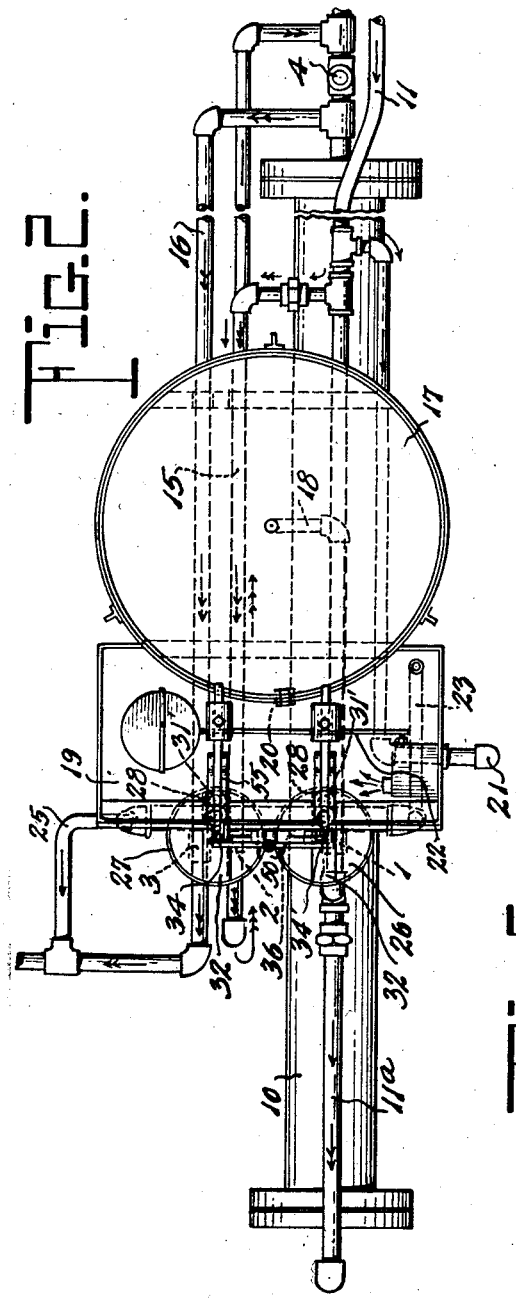
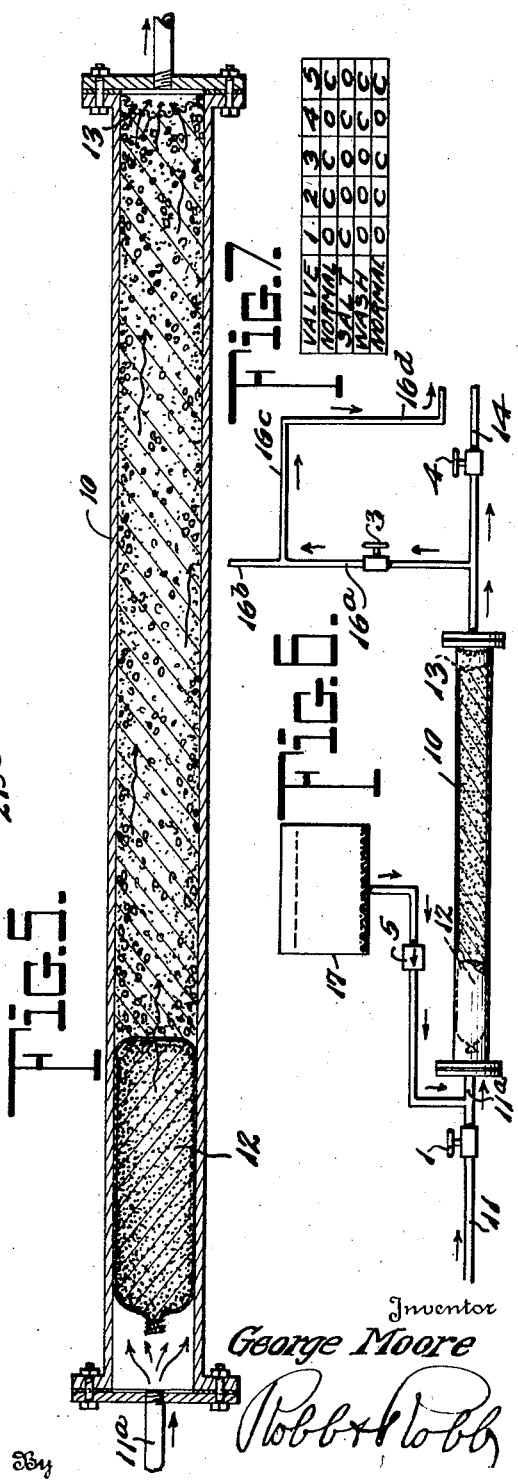
Inventor
George Moore
By Robb & Robb
Attorneys Oct. 20, 1942. G. MOORE 2,299,246
WATER SOFTENING SYSTEM
Filed Aug. 2, 1938  4 Sheets-Sheet 3
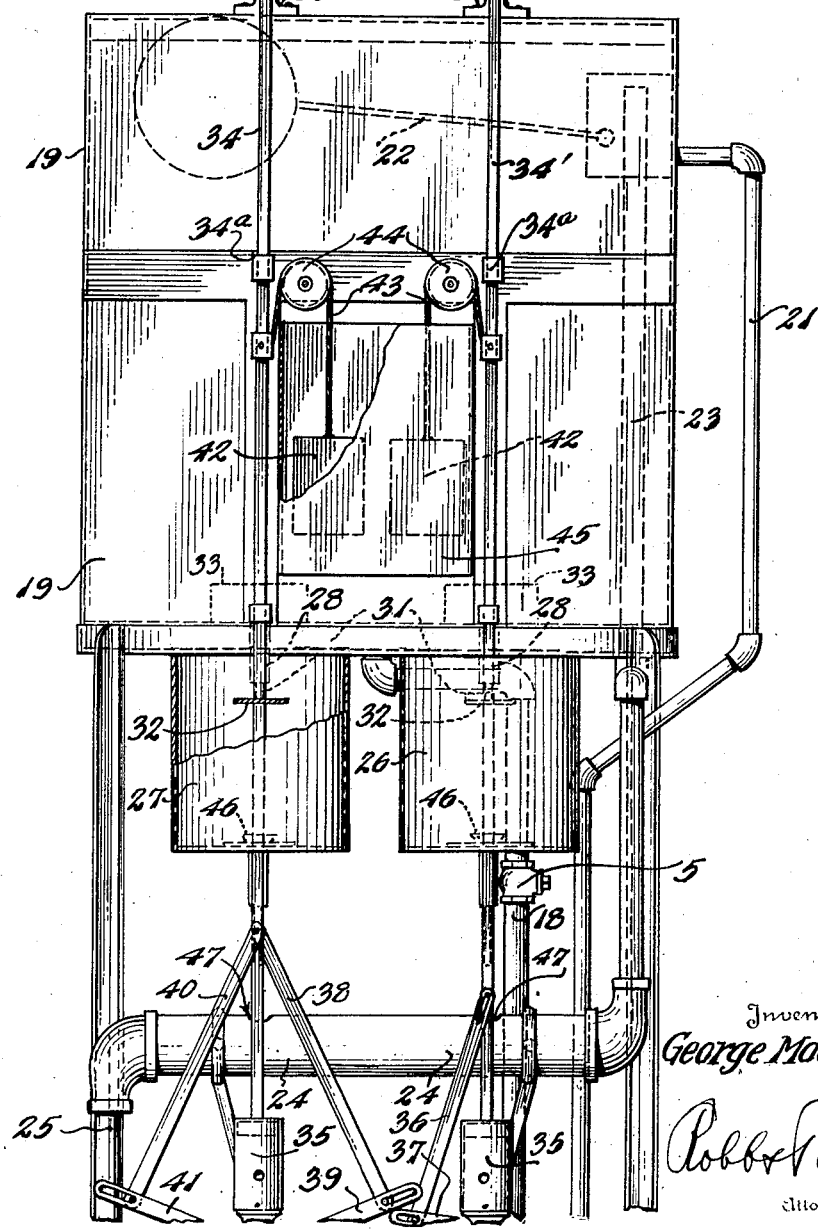
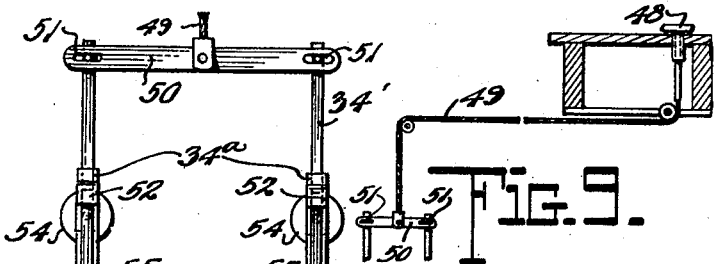
Inventor
George Moore
Robb & Robb
Attorneys Oct. 20, 1942.  G. MOORE  2,299,246
WATER SOFTENING SYSTEM
Filed Aug. 2, 1938  4 Sheets-Sheet 4
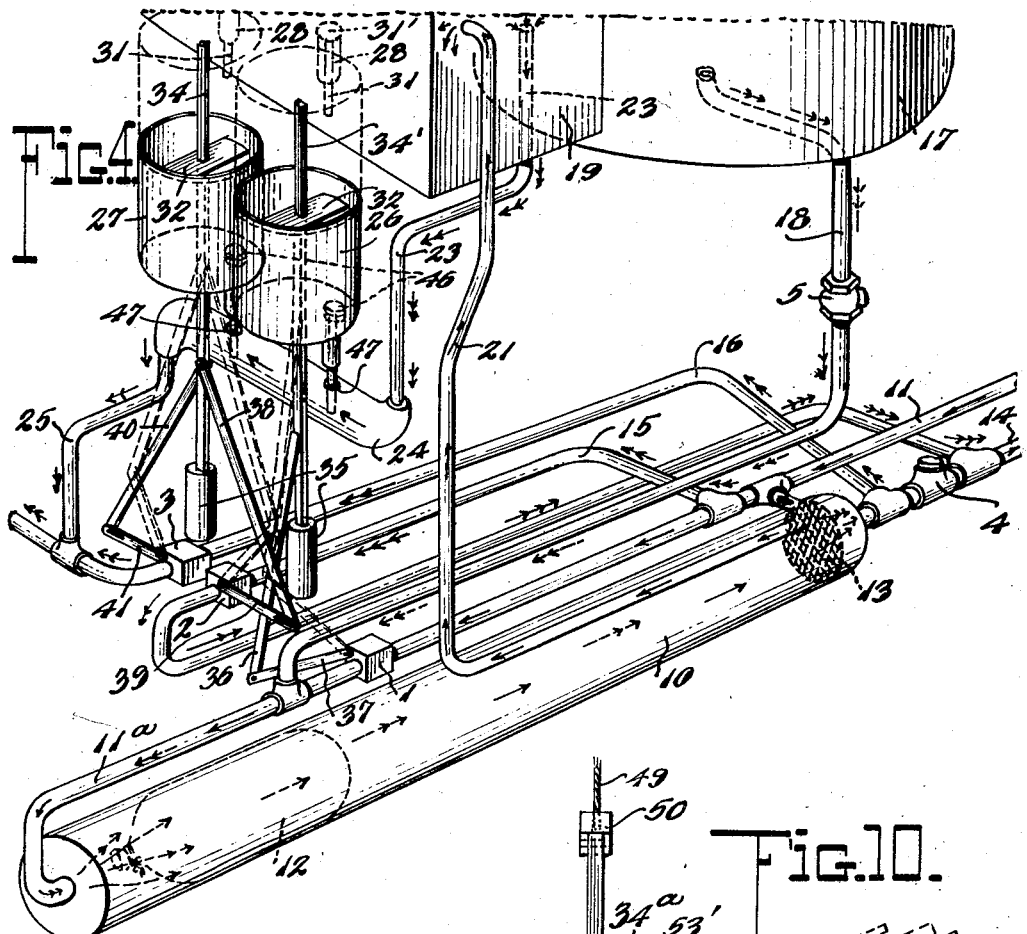
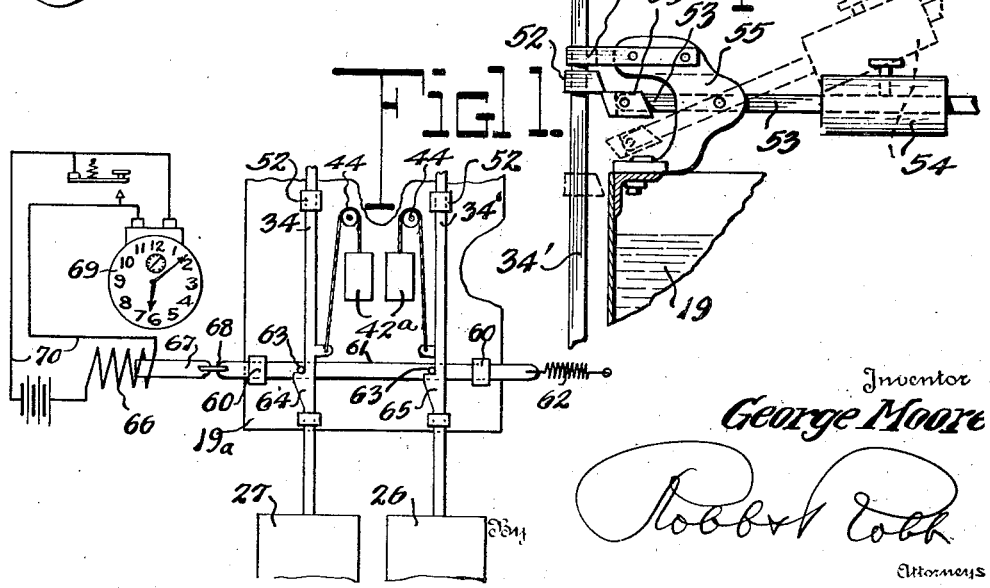
Inventor
George Moore
Robert Cobb
Attorneys Patented Oct. 20, 1942

2,299,246

UNITED STATES PATENT OFFICE 2,299,246

WATER SOFTENING SYSTEM

George Moore, New York, N. Y.; Lulu Hoag Moore, executrix of said George Moore, deceased Application August 2, 1938, Serial No. 222,721

10 Claims. (Cl. 210—24)

The present invention relates to improvements in water softening systems, especially in that type designed for domestic service, and in which the treatment of the water may be readily interrupted for regeneration of base exchange material and automatically restored to the treating cycle, without discontinuance of supply of water to the house service line.

Among the numerous objects of my present invention may be mentioned the provision of a special form of container for the base exchange material by means of which circulatory movement of the liquid therein and channeling of said material with resultant loss of treating capacity and waste of regenerating material are prevented; the provision of valve means so arranged in the system as to, on the one hand, maintain the treating flow of the liquid while holding the regeneration cycle inoperative under control of the supply line pressure, and, on the other hand, effect flow of regenerating substance and flow of untreated liquid to service during the regeneration cycle with the interruption of said pressure; and the provision of a novel liquid-controlled timing system for automatically controlling the regeneration and washing cycles upon interruption of the water softening cycle.

More specifically, the timing control feature of my invention includes an arrangement of liquid holding vessels shiftable by remote control to effect flow of predetermined quantities of liquid thereinto to provide weight operating means for variably actuating flow control valves of the system in accordance with the rate of flow of the weight providing liquid, thereby establishing the respective cycles of regenerating and washing and the time of interruption of the softening cycle.

Other and further objects and advantages of the invention will be hereinafter set forth and the novel features thereof defined by the appended claims.

In the drawings:

Figure 1 is a side elevation of an apparatus embodying my invention;

Figure 2 is a top plan view thereof;

Figure 3 is an end elevation somewhat enlarged, and parts being broken away to show more clearly certain details of construction;

Figure 4 is a fragmentary perspective view, more or less diagrammatically showing the piping and certain features of the time control mechanism employed in this system;

Figure 5 is a longitudinal sectional view through the zeolite container;

Figure 6 is a diagrammatic view showing a portion of the system for illustrating a phase of interchange of the liquids used in the system;

Figure 7 is a chart showing the position of certain valves for the various cycles of the system;

Figure 8 is an enlarged vertical section approximately taken on the line 8—8 of Figure 1;

Figure 9 is a fragmentary view diagrammatically showing the remote control for the timing mechanism, Figure 10 is a fragmentary enlarged view of the counter-weight control and rod trip instrumentalities used in the timing mechanism; and Figure 11 is a fragmentary diagrammatic showing of a further modification showing a fully automatic control mechanism.

Like reference characters designate corresponding parts in the several figures of the drawings.

Referring to the drawings, the system will more easily be understood by reference to the more or less diagrammatic showing in Figure 4. An important feature of my invention resides in the construction of the container 10 for the zeolite or other base exchange substance. This vessel has a relatively small diameter for its length, preferably from three to six inches to five or more feet in length. Thus the flow through the tube is so fast that sediment in the water does not lodge in the zeolite and thereby impair its efficiency to the extent found in the usually larger diameter containers employed in practice to give the equivalent gallonage per minute. More particularly, however, this dimensional construction has an additional advantage in that, when brine is flowed through the zeolite (and also when the water is flowed to wash out the brine), there is no chance for circulatory movement, or channeling, as is the case with a large cross section. Circulatory movement and channeling both result in loss of brine and softening capacity of the zeolite due to the fact that more wash water is required.

Hard water flows into the tank 10 from the supply line 11. A cut-off valve 1 is located in this line at a convenient point for operation by means hereinafter referred to. In the receiving end of the tank I preferably dispose a bag of activated charcoal 12, arranged in spaced relation to the entrance, while at the other end is provided a screen or filter 13 with zeolite between the charcoal and screen. From the discharge end of the tank a service line 14 leads to the house, and, in this line, there is provided a check valve 4 normally held open by the pressure of the water supply. When the cut-off valve 1 of the supply line is closed, the valve 4 will automatically seat itself to shut off the flow of the liquid from the tank 10 to the house line 14. For the purpose, however, of supplying water from the supply line, that is, hard water, to the house line 14 during the salting operation hereinafter referred to, a by-pass is provided by the pipe 15 which connects to the supply line 11 at one end and at its other end to the house line at a point beyond the check valve 4. Thus, when the valve 1 is closed and the valve 2 in the by-pass is opened, the water may flow through the by-pass and into the house service line without passing through the zeolite container, as best shown in Figure 4.

At the other side of the valve 4, a drain pipe 16 is connected to the house service line at one end and leads to any point for disposition of the discharge of liquid from the system. This drain line has in it a cut-off valve 3, and the valve 4 prevents the by-pass water in pipe 15 from flowing out to drain pipe 16 as the valve 3 on the drain line is open during salting and washing operations later referred to. It will be observed by reference to the diagrammatic showing in Figure 6 of the manually operable valve type of softener device that the drain pipe at some point in its length is provided with a vertical pipe 16a to which is connected a vent pipe 16b. A horizontal pipe 16c and a second vertical pipe 16d form a loop.

Before taking up the purpose of this loop, it is noted that a salt tank 17 is provided with a pipe 18 which communicates with the supply line 11 at one side of the valve 1, and the pipe 18 itself is provided with a pressure-operated check valve 5 which is maintained closed as long as pressure of the supply line 11a is operative beyond the cut-off valve 1. When, however, the valve 1 is closed and pressure is dropped in the pipe 18, the salt solution from the tank 17 will flow into the pipe 11a and the tank 10 for regenerating purposes. As hereinafter pointed out, the valve 3 in the drain line being open at this time, the salt solution will by gravity pressure open the valve 5, and will thus flow down and into the zeolite in the tank 10, forcing the water held by the zeolite out through the drain pipe 16. After the brine has had sufficient contact with the zeolite, the valve 1 in the supply line is opened, and this brine is washed out of the zeolite to the drain. When it is thus washed out, the drain is closed, the house line opened, and the apparatus is ready for softening.

In connection with the manual system of operation of this apparatus, I find that from ten to twenty minutes is sufficient for allowing the brine to regenerate the zeolite. In order to avoid waste of salt, by neglect in changing the valves, the raised or loop portion in the drain line hereinbefore referred to is provided so that when the brine after passing through the zeolite rises in the vertical pipe 16a to a level with the brine in the salt tank the flow ceases. Before this action occurs, it will be understood this brine flows into the tank by virtue of the difference in specific gravity of the brine and the specific gravity of the water flowing up the drain line. The vent pipe 16b is provided to prevent a siphon action which would draw more brine through than necessary and cause waste. Thus, it is that when this feature of the loop is used only a predetermined amount of brine enters tank 10 and stand pipe 16a of the loop. In the event more brine is required, the zeolite tank in that case is not completely filled with zeolite; that is to say, there is left a water space at the entrance, as seen clearly in Figure 5, between the end of the tank and the end of the charcoal bag 12. When the brine enters the tank it displaces the water in this space and thus supplies additional brine which is forced through the zeolite when the wash water enters.

The cycles of salting, washing, and regeneration of the softening process may be manually controlled as in Figure 6, but preferably are under the control of a novel timing mechanism now to be specifically described. This system includes a water tank 19 arranged in juxtaposition with relation to the salt tank and having communication therewith a few inches from the top of the respective tanks through a short nipple 20, seen more clearly in Figure 2 of the drawings. Thus, the salt tank will receive its supply of water for the solution whenever the solution is drained for purposes of regeneration. Water is fed to the water tank through the pipe 21 which connects to the supply line 11a in advance of the cut-off valve 1. For purposes of control of the supply of water to this tank, I employ a conventional ball float 22 which is connected to a valve in the usual manner, and, therefore, need not be more specifically described in this disclosure. An overflow pipe 23 extends into the tank slightly above the proper level which is to be maintained and leads to a horizontal enlarged pipe section 24 which, in turn, is connected to the drain line 16 by the pipe 25.

Weight means are provided for operating the respective cut-off valves 1, 2 and 3 by effecting delivery of water from the tank 19 into two containers 26 and 27. To this end the bottom of the tank 19 is provided with openings, one of which is shown at the top of Figure 8 having a funnel fitting 28 therein. The top of this fitting is threaded to receive a cover 29 formed with an opening 30 therein of sufficient size to permit the container 26 thereunder to receive enough water to approximately half fill the same in a period of approximately ten minutes. The delivery of this water is under the control of a valve member 31 having a stem depending into the path of movement of a cross plate 32 secured in the top part of the container 26. The head 31' forms the valve proper and when seated normally closes the fitting. A screen 33 prevents stoppage of the aperture 30 by foreign matter in the water.

The second opening of the tank 19 is correspondingly fitted with a duplicate of the parts, but in this case the aperture 30 in the cap is smaller to the extent of allowing the container 27 to be filled approximately half way in about twenty minutes.

The containers 26 and 27, Figure 3, are mounted on vertical rods 34, 34', which extend through their bottoms to dash pots 35 for controlling the drop of the containers, and are guided in their vertical movements by guides 34a. When these vessels are filled to the extent above mentioned and released as hereinafter explained, enough weight is provided to actuate the valves 1, 2 and 3. For this purpose the rod 34' is connected by a slotted link 36 to the valve lever 37 for valve 1, and the rod 34 is connected by link 38 to lever 39 for valve 2 and by link 40 to lever 41 for valve 3, the two valves 2 and 3 being always operated together.

The containers 26 and 27 with their rods are counterbalanced by weights 42 connected to the respective rods by cords 43 passing over pulleys 44, said weights being preferably housed in the casing 45, Figure 1, on the side of the tank 19. In the bottom of each container is provided a drain valve 46, similar in construction to the tank valves above described. The stems of these valves, when the containers drop, pass into openings 47 in the horizontal drain pipe section 24 and by contact with the bottom thereof are unseated, thereby allowing the contents to flow into and out of the drain pipe.

To set the containers 26 and 27 in their operative elevated positions for the purpose of initiating the regenerating cycle, I provide a remote control seen best in Figure 9. This consists of the button 48 which may be located at any desired place in the house and connected to the cable 49 leading to the cross bar 50 in turn connected to the upper ends of the rods 34, 34', by pin and slot connections 51. By pulling on the cable the rods and containers are raised until lugs 52 (see Figure 10) on the rods engage their respective counterweight arms 53, on the ends of which are adjustably mounted weights 54. The weight arms are pivotally connected at intermediate points to brackets 55 supported on the top of the tank 19 and act to hold the containers elevated until the amount of water has run into the same to overbalance the weights. The lugs then escape from the pivoted one-way latches 53' mounted on the ends of the arms as the weight arms move to their unbalanced position as shown in broken lines in Figure 10, allowing the containers to drop under control of the dash pots 35 until their valves contact with the drain pipe section 24 and effect discharge of the vessels as before stated. The containers remain in the lower position until the next regeneration cycle is started by again lifting them by the cable 49 until the lugs 52 pass by the latches 53' which are free to pivot in a clockwise direction as viewed in Figure 10 but not in a counter-clockwise direction.

The operation of this system will be apparent from the foregoing and may be summarized as follows: During the normal flow, that is water softening operation, the hard water from the supply line flows under pressure through pipe 11 (valve 1 being open) to and through zeolite tank 10, and service line 14 to house, as shown by single arrows, check valve 4 being held in open position by the service pressure, the containers 26 and 27 being in their lowered position, and valves 2, 3 and 5 being closed as indicated by the chart in Figure 7. When the softening capacity of the zeolite has been expended, the cable 49 is pulled to raise the containers 26 and 27 until they are engaged by the counterbalance latches 53' on arms 53. This operation closes cut-off valve 1 in supply line 11 and opens cut-off valve 2 in bypass line 15 and cut-off valve 3 in drain line 16. Pressure of the supply line being cut off beyond valve 1, check valve 4 closes and valve 5 in the pipe 18 opens, whereupon the regeneration cycle starts by flow of the salt solution from tank 17 to tank 19 as shown by the double arrows in Figure 4. Simultaneously, the water from supply line 11a is bypassed through pipe 15 to house line 14, as shown by triple arrows. Raising of the containers 26, 27 in the foregoing operation causes the valves 31 of the water tank 19 to open to deliver water to said containers, the container 26 dropping at a predetermined time to open the valve 1, followed by an automatic closing of the valve 5. The salt solution in the zeolite tank is now displaced through the drain line until the washing cycle is completed. In the additional period of time, container 27 is released and drops, thereby closing by-pass valve 2, drain valve 3, and opening check valve 4, thus restoring the system to normal softening operation. In the meantime, the water in tanks 19 and 17 is replenished through the supply pipe 21, as heretofore described. Valves 2 and 3 remain open during the entire salting and washing operations. Valve 1 is open during the washing operation, allowing service pressure from pipe 11 to be effective through pipe 18 holding the check valve 5 closed which prevents escape of salt solution from the salt tank 17 at all times except during the salting period, at which time the valve 1 is closed. The drain pipe loop used in the manual form of Figure 6 may be used in this automatic form also, but it is preferably omitted since the automatic timing mechanism prevents waste of the salt solution.

Figure 11 illustrates a further modification in which the entire cycle of softening, salting, and washing is automatically controlled.

The water tank 19a is provided with guides 60 in which is horizontally and slidably disposed latch rod or bar 61 normally stressed to the right by a spring 62. Detent pins 63 project outwardly from the bar in the path of the cam-shaped projections 64 and 65 carried by the vertical rods 34 and 34', respectively, carrying the containers 27 and 26. The weights 42a in this construction are arranged similarly to the weights 42 of the preferred form, but must be sufficiently heavy to not only counterbalance weight of the containers 26, 27, as contemplated in the preferred form, but must also overbalance the empty containers 26, 27 and the rods 34, 34', so that, when the bar 61 is moved to the left to disengage the pins 63 from the top shoulders of the projections 64, 65 on the rods 34, 34', the empty containers will be elevated by the weights 42a in order to raise the lugs 52 fixed on the rods 34, 34' (as seen in Figure 10) above the latches 53' of the weighted arms 53.

The means for shifting the rod 61 to the left comprises any suitable time-controlled means, but, for purposes of illustration, I have disclosed a solenoid magnet 66 having an armature or movable core 67 connected at 68 to the slide bar 61. Any suitable time-control device 69 is interposed in the solenoid operating circuit 70.

In the operation of this form of the invention, after determining the period of time necessary for normal water softening operations between the regenerative periods, the time control device 69 is adjusted to close the solenoid circuit 70 at the expiration of each such period. The armature 67 is drawn to the left by the magnet 66. This moves the bar 61 to cause disengagement of the pins 63 carried thereby from the projections 64, 65 on the rods 34, 34'.

The weights 42a elevate the containers 27, 26 causing the lugs 52 of the rods 34, 34' to engage the latches 53' of the pivoted weight arms 53. The balance of the operation is the same as described in connection with the preferred form. Lifting of the containers actuates the valves 1, 2 and 3 and opens the valve 31' due to engagement of the valve stems 31 with the cross plates 32 on the containers. Upon overbalancing of the weights 54 and 42a by the liquid discharging into the containers, they will move downwardly to cause reengagement of the projections 64, 65 on the rods 34, 34' with the pins 63 on the bar 61, the magnet 66 at this time being deenergized. The discharge valves of the containers will be opened to empty their contents, but the pin and projection engagement above referred to will retain the containers in their lower position until the termination of the next softening period as controlled by the timing device 69.

It will be apparent from the foregoing that a simple and inexpensive water softening system is provided by this apparatus and one requiring a minimum amount of attention. Obviously, also, the details of construction may be changed without departing from the spirit of the invention and within the scope of the claims hereto appended.

Having thus described my invention, what I claim as new and desire to secure by Letters Patent is:

1. In a water softening system, the combination of a zeolite tank, a salt solution tank having a conduit leading therefrom and communicating with the zeolite tank, water supply lines leading respectively to said zeolite tank and connected to the conduit aforesaid, and leading from the zeolite tank to a place of usage of the water, valve means for control of flow of the water and salt solution in said conduit and in said water supply line to the zeolite tank, and means for controlling said valve means comprising a water tank having normally closed and shiftable valve means for controlling discharge of water therefrom, and normally empty and shiftable container means operable to shift said tank valve means to open position to cause flow of water from the water tank into the container means to provide a pre-determined weight, and means operably connecting said container means to the first mentioned valve means for actuating the latter by shifting movement of the container when the water therein attains the predetermined weight aforesaid.

2. A water softening system as set forth in claim 1, wherein said shiftable container means comprises a plurality of independently shiftable containers movable to actuate the water tank valves and to receive predetermined weights of water from the said water tank, means for supporting said containers and a predetermined weight of water therein and automatically operable to release said containers in a predetermined order due to the weight of the water received in the containers, said containers having independently operative connection with the valve means controlling the flow of the water and the salt solution to the zeolite tank, whereby the said valves are shifted by the said containers to effect the salting, washing operations in a predetermined order by movement of the said container means.

3. In a water softening system, the combination of a tank for containing a base exchange material, a second tank for containing a regenerative solution for regenerating the base exchange material, water supply lines leading respectively to the first mentioned tank and leading from the same to a place of usage of the water, a regenerative solution line leading from the second tank and connected to the water supply line leading to the first-mentioned tank valve means for controlling the flow of water and the regenerative solution, and means for actuating said valve means, said last mentioned means including a normally empty container operatively connected to the valve means aforesaid and movable to different positions, the movement of the container to one of its positions serving to actuate the valve means to interrupt the flow of water from the water supply line to the base exchange material tank and to also establish a flow of the regenerative solution to the base exchange material tank, and movement of the container to another of its positions serving to actuate the valve means to discontinue the flow of the regenerative solution to the base exchange material tank and re-establish a flow of water from the water supply line to the base exchange material tank, means controlled by the positioning of the container in one of its positions for introducing water into the container to provide a pre-determined weight, means for supporting the container and a pre-determined weight of water therein and releasable by excess application of weight to the container to move the container to its other position aforesaid, and means responsive to the latter movement of the container for discharging the water from the container and for conditioning the same for a subsequent valve means actuating movement.

4. In a water softening system, the combination of a zeolite tank, a salt solution tank, water pressure supply lines extending respectively from a water pressure source to said zeolite tank and from said zeolite tank to a place of usage of the water, a water pressure-controlled communicating passage between said salt solution tank and the said water pressure supply line to the zeolite tank to permit flow of salt solution from said salt solution tank upon a reduction of pressure in said passage, a drain line connected to said water pressure supply line between the zeolite tank and the place of usage of the water, shiftable cut-off valve means in said drain line, and in said water pressure supply line between the water pressure supplying source and the connection of the water pressure-controlled communicating passage with the said water pressure supply line to the zeolite tank, a water tank, water discharge means therefor, normally empty movable container means positioned to receive water from said water discharge means, when in one position, and to discharge water therefrom into the drain line when in another position, operating means between said container means and said cut-off valve means for operating said valve means by said movable container means, means for holding said container means in water-receiving position for a predetermined time, said container means being shiftable in another direction due to weight of water received thereby to thereby actuate the cut-off valve to close the cut-off valve in the water pressure supply line to the zeolite tank and to open the cut-off valve in the drain line to effect a reduction in the pressure of the water in the zeolite tank and in the water pressure-controlled communicating passage between the salt solution tank and the water supply line to the zeolite tank, whereby flow of water through the zeolite tank is discontinued and flow of salt solution is initiated and valve means in said container means, means to actuate said container valve means incident to the last-mentioned container movement for automatically effecting discharge of the water from said container into the drain line.

5. In a water softening system, the combination of a zeolite tank, a salt solution tank, water pressure supply lines extending respectively from a water pressure source to said zeolite tank at one end thereof, and from said zeolite tank at the other end thereof to a place of usage of the water, a water pressure-controlled passage between said salt solution tank and the water pressure supply line to the zeolite tank having means to permit a flow of solution through said passage from said salt solution tank only upon a reduction of pressure in said passage, a drain line connected to said water pressure supply line between the zeolite tank and the place of usage of the water, shiftable cut-off valve means located in said drain line, and in said water pressure supply line between the water pressure source and the connection of the supply line with the pressure-controlled communicating passage to the salt solution tank, a water tank, water discharge means therefor, a normally empty movable container shiftable to receive water from said water discharge means when in one position, and to discharge water therefrom into the drain line when in another position, operating means between said container and said cut-off valve means in the water pressure supply line to the zeolite tank for operating said cut-off valve means from said container incident to movement of the container, means for holding said container in water receiving position for a predetermined time, said container being shiftable into its second position due to weight of water received thereby to thereby actuate the cut-off valve means, whereby flow of water through the zeolite tank is discontinued, means for automatically effecting discharge of the water from said container into the drain line, and a second normally empty container also shiftable to receive water from the water tank, shiftable valve means in said drain line, an operating connection between said second container and said drain line cut-off valve means operable by said second container incident to movement thereof to shift the cut-off valve means in the drain line to open position to effect a reduction of pressure in said zeolite tank and a corresponding reduction of pressure in said water pressure-controlled passage between the said salt solution and zeolite tanks to effect a flow of salt solution from the salt solution tank into said zeolite tank, and means for draining the second container upon completion of its drain line cut-off valve actuating movement.

6. In a water softening system, the combination of a container for holding a base exchange material, a water supply pipe connected thereto and to the place of usage, a tank for holding a regenerating substance connected to said first-named container, a drain line leading from said container, a by-pass for by-passing the water supply around said container during discontinuance of the water softening operation, valves for controlling the flow of water through the base exchange material container and solution from the regenerating substance tank, and means for controlling said valves to effect regeneration of the base exchange material, by-passing of the water during the regeneration, and drainage of the regenerating substance, said control means including a water tank connected to the water supply, movable containers for receiving water from said water tank, rod members on which said containers are mounted, guide means for said rod members, means for actuating said rod members and containers to effect discharge of water from the water tank into said containers, including valve means operable by said containers for control of flow of water thereinto and therefrom, connecting means for connecting the rod members to the valves for the control of the flow of water to the base exchange material container, water by-pass, and drain aforesaid, and means for holding said movable containers in water-receiving position.

7. In a water softening system, a container for holding a base exchange material having a water inlet at one end and a screened discharge at its other end connected to a house service supply line, a tank for holding a regenerative substance having communication with said container inlet, a normally closed control valve for controlling the flow of the regenerative substance to the container inlet aforesaid, a water supply line for supplying water to said inlet, a normally open control valve for said water supply line for interrupting flow of water from said supply line to said inlet, a normally open discharge check valve in said house service supply line, a drain pipe connected to said house service supply line between said discharge check valve and the base exchange container and having a normally closed valve therein, a water by-pass line connected at one end to said water supply line ahead of the control valve for the latter and connected at the other end to the house service supply line between the discharge check valve and the house service, a normally closed by-pass control valve for said by-pass line, means for operating said drain pipe, by-pass line, and water supply line control valves to one position for establishing communication between the discharge end of the base exchange container and the drain line, and between the water supply line and the house service supply line, and interrupting communication between the water supply line and the inlet end of the base exchange container, and weight-operated means coacting with and operatively connected to said control valves aforesaid for progressively operating said control valves to first interrupt communication between the regenerative supply tank and the inlet end of the base exchange container and subsequently closing the drain pipe control and the by-pass line control valves and establishing communication between the water supply line and the inlet end of the base exchange container.

8. In a water softening apparatus of the class described including control valves therefor to effect water softening, regenerating and washing operations, a weight operated mechanism for actuating said valves in a predetermined cycle comprising a water supply tank having normally closed discharge valve means, a normally empty movable container having a normally closed discharge valve, means mounting said container for upward movement into a position to receive water from said water tank discharge valve and for downward movement, means on said container cooperating with said water tank discharge valve means to open the latter when in said upper position to allow water to be discharged from the water tank into said container, releasable counterbalancing means arranged to support said container in its upper position with a predetermined weight of water only received therein from said water tank, drain pipe means arranged to receive water from said container when in lowered position, said drain pipe means being disposed, when the container is moved to its latter position, to engage and open said container discharge valve and empty said container, operating connections between said container and said control valves for the water softening apparatus to actuate the same by the container incident to upward movement and downward movement thereof, and means for imparting upward movement to the container to raise the same to water-receiving position and to cause supporting engagement thereof with counterbalancing means.

9. In a water softening system, the combination of a zeolite tank, a salt solution tank, a water tank having water discharge valve means, water supply lines extending respectively from a water source under pressure to said zeolite tank, and from said zeolite tank to a place of usage of the water, a communicating passage extending from said salt solution tank and connected to the supply line in the zeolite tank between said water source and the zeolite tank, said passage having pressure operated control valve means therein to permit flow of solution through the passage into said supply line to the zeolite tank only upon a reduction of pressure in the last-mentioned supply line, shiftable valve means for closing said supply line between the said water supply source and the zeolite tank and for relieving pressure on the supply line between the zeolite tank and the place of usage of the water, valve actuating means for shifting said last-mentioned valve means to and from closed position, movable weight operated container means connected to the said valve actuating means, means for moving said container in one direction to actuate said water tank discharge valve and to receive water from said water tank, discharge valve means in said container, means to actuate said container discharge means to empty said container when the container is moved in another direction, actuating means for moving the container when empty to the first-mentioned position, supplemental weight controlled release means for supporting the container and a predetermined weight of water therein in said first position and releasable by excess application of weight to the container, releasable means for holding the empty container in said second position.

10. A water softening system as set forth in claim 9, wherein the releasable means for holding the container in said second position comprises an adjustable time-controlled mechanism and means for actuating said release means from said mechanism.

GEORGE MOORE.